United States Patent [19]
Ross

[11] 3,785,387
[45] Jan. 15, 1974

[54] CHEMICAL PROCESSING FACILITY

[75] Inventor: Francis D. Ross, Long Beach, Calif.

[73] Assignee: Northrop Corporation, Los Angeles, Calif.

[22] Filed: July 20, 1972

[21] Appl. No.: 273,546

[52] U.S. Cl. .................................. 134/95, 134/104
[51] Int. Cl. ...................... B08b 3/02, B08b 15/00
[58] Field of Search .................. 134/80, 81, 94, 95, 134/99, 103, 104, 107

[56] References Cited
UNITED STATES PATENTS

| | | | |
|---|---|---|---|
| 2,471,506 | 5/1949 | Wiswall........................... | 134/104 X |
| 2,558,628 | 6/1951 | Redin................................. | 134/95 |
| 2,702,042 | 2/1955 | Smith................................ | 134/95 X |
| 2,963,029 | 12/1960 | Bock................................ | 134/95 X |
| 3,400,726 | 9/1968 | DeBernard du Grail............. | 134/95 |
| 3,593,728 | 7/1971 | Sauer.............................. | 134/103 X |

*Primary Examiner*—Robert L. Bleutge
*Attorney*—Willard M. Graham and William W. Rundle

[57] ABSTRACT

A hermetically sealed booth enclosing a quantity of parts to be chemically processed, and tanks containing the various chemical solutions being positioned below the parts booth and sequentially movable to positions below the booth whereby the solution in a single tank is pumped into the booth, sprayed over the parts and returned to the tank through a drain opening in the floor of the booth. All fumes and contaminants emanating from the solutions are passed through filters or air washers before being exhausted to atmosphere.

8 Claims, 2 Drawing Figures

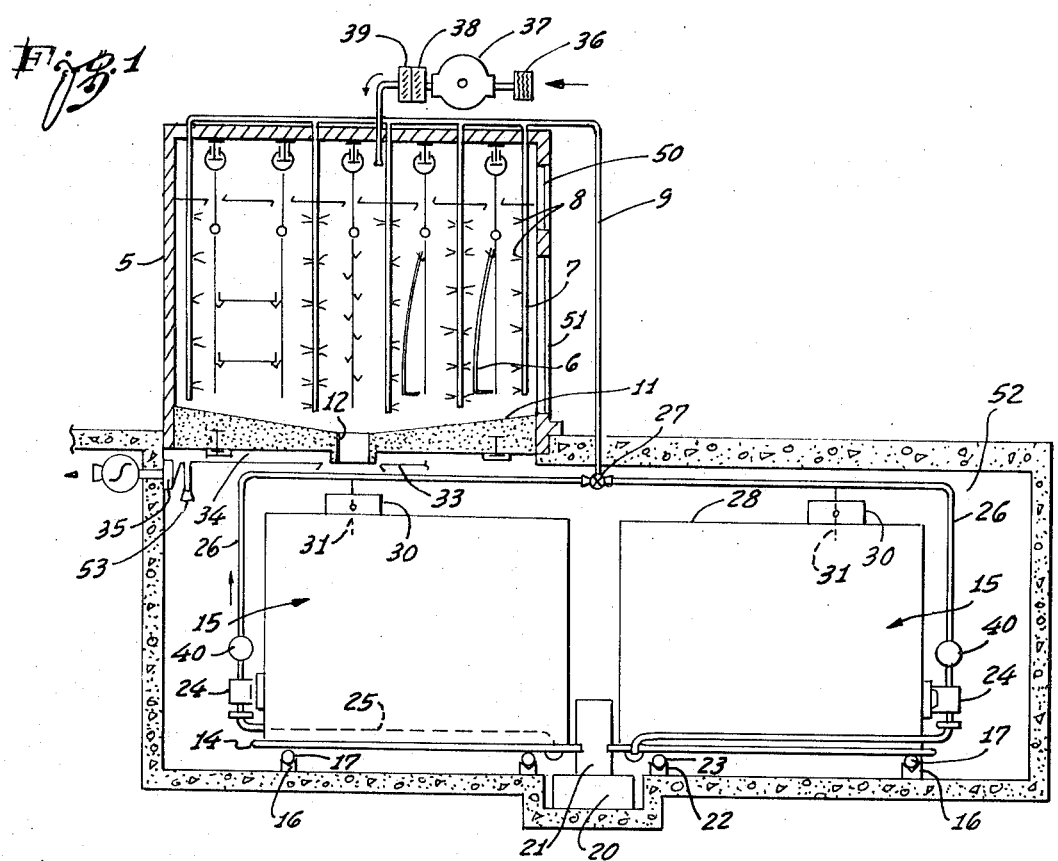
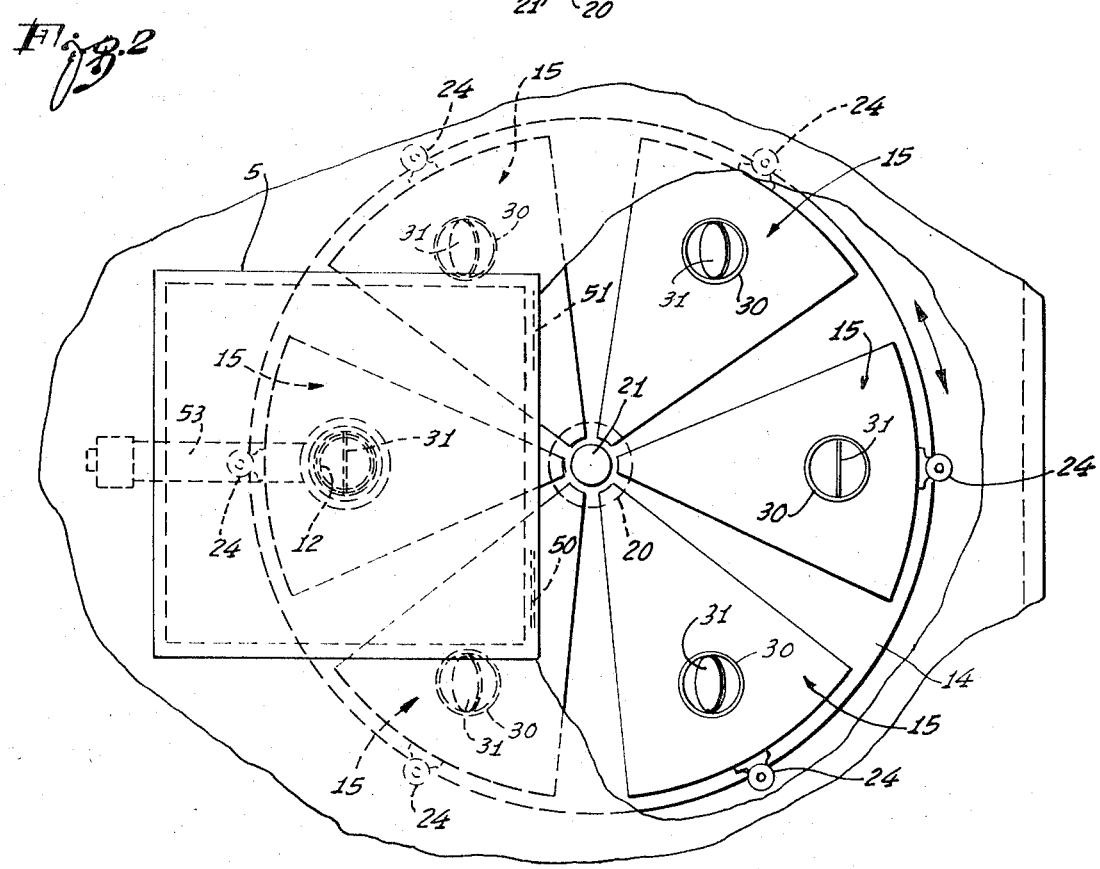

CHEMICAL PROCESSING FACILITY

At the present time chemical processing for metal parts wherein such processes as degreasing, alkaline cleaning, deoxidizing, conversion coating, including the intermediate rinsing and dryoff steps, are generally performed in open tank facilities. With present and everincreasing demands for air pollution control, i.e., abatement of airborne contaminants, it is desirable if not critical that metal processing be performed in a closely controlled environment wherein air pollution is minimized under the exacting standards laid down by Air Pollution Agencies.

Another important aspect in chemical processing is employee safety. An important object of my present invention is to insure maximum safety for the workers.

Still another important consideration in chemical processing is economy, i.e., conservation of chemicals and space.

To this end, it is an important object of my present invention to provide a chemical processing facility which reduces air pollution to a negligible quantity. Its relatively light weight permits installation in upper parts of structures while open processing tanks with their heavy weight of solutions normally require ground support or heavy structures.

It is another object of my invention to provide a chemical processing facility which is relatively economical and requires a minimum amount of space.

Other important objects and advantages inherent in my invention will readily be appreciated by those skilled in the chemical processing arts in the ensuing detailed specification with reference to the appended drawings wherein:

FIG. 1 is a generally schematic side elevational view of the present invention.

FIG. 2 is a schematic plan view of the prsent invention.

Briefly, in the facility of my present invention, exposure of the workers to the various chemical solutions is reduced to a minimum, the solutions being retained in enclosed vessels or tanks during all phases of the processing. The solution tanks are located in a chamber below a substantially hermetically sealed processing booth in which the metal parts to be processed are enclosed, the solutions, including water for rinsing, being pumped from the tanks through spray nozzles provided in a number of vertical pipes arranged throughout the booth, and returned to the tanks through a central drain spout in the floor of the booth. Following the solutions and the final rinse cycles, dry heated, filtered air is blown over the parts in the booth prior to removal therefrom.

Referring to FIG. 1, a substantially hermetically sealed processing booth 5 is equipped to support, in suitable racks or by suspension means, a number of metal parts 6 to be chemically treated. Extending throughout the booth 5, I provide fluid carrying pipes 7 equipped with spray nozzles 8 along their lengths and suitably located and arranged therein to provide the desired spray pattern relative to the parts 6 to be treated.

The pipes 7 are connected, preferably at their upper ends to a supply line 9 which conveys the desired chemical solution from a source of supply.

The floor 11 of the booth tapers downwardly from its sides to a sump or drain spout 12 preferably located in the center of the floor 11.

The processing booth 5 is preferably elevated above a rotatable turntable or base 14 on which a desired number of sector or triangularly shaped tanks 15 are mounted and arranged with their apexes located at the center of the platform, generally as shown in FIG. 2.

The base 14 is supported to rotate on a circular rail or track 16 on casters or wheels 17 mounted on the underside of the base 14 in any convenient manner.

For rotation a drive motor 20 is located at the hub of the base 14, the output shaft of the motor 20 driving the base through a suitable gear box 21 mounted to the base 14 in the conventional manner. Alternatively, the drive motor can be located at the periphery of the turntable and coupled with friction means or gears (not shown) provided on the rim of the turntable.

As shown in FIG. 1, it may be advisable, in view of the considerable weight of tanks 15, to provide an inner track 22 concentrically arranged within outer track 16, suitable wheels or casters 23 being provided beneath base 14 for engagement therewith.

Each tank 15 is provided with a pump 24 which draws the chemical solution from the selected tank interior through a suction pipe 25, through supply pipe 26 to a swivel 27 preferably located above the center of base 14. A heat exchanger 40 heats the solution to predetermined operating temperature. The pumps not in usage act as check valves to prevent solutions from being pumped from one tank to another, or if desired, check valves may be provided in each pipe 26 adjacent the swivel 27.

The top of each tank 15 is enclosed by a cover 28 having, adjacent to the outer side of the tank, a verticl pipe or funnel 30 the opening of which is controlled by a butterfly valve 31 for tanks generating fumes or contaminates which can be remotely or automatically controlled for opening and closing.

Surrounding the lower end of drain spout 12, I provide a hood 33 having a vent 34 to exhaust the fumes from operating tank 15 and from booth 5. Fumes trapped in hood 33 are exhausted through a filter or air washer 35 in the outlet of vent 34 and the filtered or washed air is exhausted to the atmosphere.

For air drying parts 6 in booth 5, air is drawn from ambient atmosphere by a compressor or fan 37 and passed through an air filter 36, air dryer 38 and heating chamber 39 and blown over parts 6.

Air exhausted from booth 5 is, as with fumes from hood 33, passed through the air washer 35 before being exhausted to atmosphere.

Operation of the facility, which may be done by programmed control (not shown), is as follows: parts 6 to be treated are suspended or placed in racks (not shown) in booth 5. The base 14 is rotated to position the tank 15 containing the predetermined solution below booth 5 with the funnel 30 aligned with booth drain spout 12. The butterfly valve 31 of the tank is opened and the corresponding pump 24 is actuated to pump the predetermined solution through supply pipe 26 and the solution sprayed over the parts 6 by nozzles 8 for the required processing time. The solution drains through drain spout 12 and is returned to its tank 15.

Following the initial cycle, case 14 is rotated to position the next tank beneath booth 5 and the spray cycle is repeated for the next chemical treatment.

When required in the processing cycle, rinse water is pumped from a source thereof, such as one of the tanks 15, and sprayed over the parts to completely remove all traces of chemicals. Following this the blower 37 is activated to blow dry heated air over the parts 6 to remove all moisture whereupon the parts may be removed and the next batch installed for processing.

As mentioned above, all of the processing steps described above may be, if desired, performed with a programmed punched tape, for example, automation. I do not deem it ncessary, however, to describe or show the programming control apparatus since such apparatus is notoriously well known, and since such apparatus forms no part of my present invention.

Glass covered ports or windows 50 can be provided in doors 51 leading into the booth 5, for visual inspection of the parts as they are being treated.

For additional environmental protection I have housed the solution tanks in a substantially hermitically sealed chamber 52 and provided a chamber exhaust passage 53 into vent 34. Fumes from any spillage will be washed or filtered to remove substantially all contaminants before being exhausted to the atmosphere.

Another embodiment (not shown) of this invention accomplishing the same results without rotatable tanks is an equivalent system having the pump outlet lines from the tanks all fixed directly to a substantially common junction to booth supply line 9, through check valves if desired. In this latter case, the booth drain spout 12 would drain into a fixed distributor or manifold having separate connections to return lines to the respective tanks, and an on-off control valve at each such return line connection operable at the same time as its corresponding tank pump.

I have thus provided a chemical treatment facility in which no fumes emanating from the tanks, from the booth, or from the tank storage chamber are permitted to escape to atmosphere without first being washed or filtered to remove substantially all contaminants, thereby assuring that no chemical solutions or hostile fumes will endanger the safety of the workers to pollute the environment.

While I have described and shown in detail one preferred embodiment of the facility of my invention, it is to be clearly understood that the specification is intended for illustration and example only, the spirit and scope of my invention being limited only by the recitations of the following claims:

I claim:

1. A chemical processing facility comprising a substantially hermetically sealed booth adapted to contain parts to be treated, a drain spout in the floor of said booth, a plurality of covered tanks for containing chemical solutions and the like, pump and delivery means associated respectively with said tanks to selectively pump the contents from each said tank into said booth and over parts contained therein, said solution draining through said drain spout, return means for returning said drained solution to its corresponding tank, means for removing residual solutions and contaminants from said booth, at least one sleeved opening being provided in the cover of each tank, and including a rotatable base supporting said tanks below said booth, said base being located with respect to said booth so that the sleeved opening of said tanks are aligned with said drain spout in said booth as said base is rotated.

2. The invention defines in claim 1, wherein said delivery means comprises a plurality of pipes and nozzles supported in said booth to introduce treating liquid into said parts.

3. The invention defined in claim 1, in which closure valve means is housed in said sleeved openings and means for operating said valve to substantially seal said tanks when said tanks are not aligned with said drain spout in said booth.

4. The invention defined in claim 1, including means for rotating said base to position one said tank, in sequence, after another in aligned position with said drain spout in the sequence dictated by the chemical process.

5. The invention defined in claim 1, in which means are provided for heating said chemical solutions in said delivery means, as dictated by the chemical process.

6. The invention defined in claim 1, in which means are provided for introducing drying air into said booth, said drying air being exhausted from said booth throuh said spout, and including vent means surrounding said spout, said vent means having an air washer in an outlet thereof to the atmosphere.

7. The invention defined in claim 6, in which means are provided for heating and filtering said drying air prior to said drying air being introduced into said booth.

8. The invention defined in claim 6, in which the said tanks are located in a substantially hermetically sealed chamber in which means are provided for exhausting fumes from said chamber through said air washer before being exhausted to the atmosphere.

* * * * *